US010610057B1

(12) United States Patent
Billman et al.

(10) Patent No.: US 10,610,057 B1
(45) Date of Patent: Apr. 7, 2020

(54) USER NOTIFICATION OF SMART COOKWARE HANDLE TEMPERATURE

(71) Applicant: Haier US Appliance Solutions, Inc., Wilmington, DE (US)

(72) Inventors: David William Billman, Louisville, KY (US); Michael Blum, Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 16/269,641

(22) Filed: Feb. 7, 2019

(51) Int. Cl.
*A47J 45/06* (2006.01)
*F24C 7/08* (2006.01)

(52) U.S. Cl.
CPC ............ *A47J 45/068* (2013.01); *F24C 7/087* (2013.01); *A47J 2202/00* (2013.01)

(58) Field of Classification Search
CPC ...... A47J 45/068; A47J 45/061; A47J 45/071; A47J 36/00; A47J 36/32; A47J 37/106; F24C 15/00; F24C 3/12; F24C 7/087
USPC ........... 340/425.5, 457, 581, 584, 588, 589, 340/870.17; 206/459.1, 459.5; 219/240, 219/241, 438, 497; 99/331, 403, 422
See application file for complete search history.

(56) References Cited

U.S. PATENT DOCUMENTS

| 4,574,184 A * | 3/1986 | Wolf ................... A47J 27/0802 219/440 |
| 7,112,765 B2 | 9/2006 | Dall'Asta |
| 2004/0016348 A1 | 1/2004 | Sharpe |
| 2013/0056379 A1* | 3/2013 | Wong ....................... A47J 36/32 206/459.1 |
| 2014/0251987 A1* | 9/2014 | Reay ........................ F24C 7/088 219/756 |
| 2015/0355234 A1* | 12/2015 | Palaniappa .......... G01R 1/0466 324/756.02 |
| 2016/0037955 A1* | 2/2016 | Kim ........................ A47J 27/57 99/344 |
| 2016/0066744 A1* | 3/2016 | Baxi ....................... A47J 36/32 99/343 |
| 2019/0141794 A1* | 5/2019 | Richcreek .............. H05B 6/062 |

FOREIGN PATENT DOCUMENTS

| CN | 203676920 U | | 7/2014 | |
| CN | 2075904 | * | 7/2018 | ............. A47J 45/06 |
| CN | 207590470 U | | 7/2018 | |
| JP | 2018096607 | * | 6/2018 | ............. F24C 15/00 |
| JP | 2018096607 A | | 6/2018 | |
| KR | 20050079961 A | | 8/2005 | |
| WO | WO2004095994 A1 | | 11/2004 | |

* cited by examiner

*Primary Examiner* — Hung T Nguyen
(74) *Attorney, Agent, or Firm* — Dority & Manning, P.A.

(57) ABSTRACT

A method and system are provided that include features for preventing damage to smart components embedded within or attached to a handle of a cookware placed on a heating element of a cooktop appliance. In one aspect, if the sensed temperature of the handle exceeds a first temperature threshold, an alert can be presented to a user indicating that the handle is located in a hot environment and thus requires relocating. In another aspect, if the sensed temperature of the handle exceeds a second temperature threshold, the power output of one or more heating elements generating thermal energy can be reduced to prevent damage to the smart components embedded within or attached to the handle of the cookware.

17 Claims, 4 Drawing Sheets

USER NOTIFICATION OF SMART COOKWARE HANDLE TEMPERATURE

FIELD OF THE INVENTION

The subject matter of the present disclosure relates generally to smart cookware and connected cooking appliances. More particularly, the subject matter of the present disclosure relates generally to user notification of pan handle temperature of a smart cookware.

BACKGROUND OF THE INVENTION

Some smart cookware, such as pots and pans, include sensing devices, wireless interface components, and other smart cookware circuitry embedded within or otherwise attached to a handle of the smart cookware. Such components embedded in the handle of smart cookware are typically limited by a temperature threshold. That is, if the temperature threshold of one or more of the components is exceeded, damage to one or more of the components can result. Thus, to prevent damage to the smart hardware components embedded within the handle, attention is needed to the location of the handle on the cooktop to avoid exceeding the temperature threshold of the smart hardware components. This is particularly true for smart cookware used with gas burners as the handle tends to get much hotter than it would otherwise if the smart cookware was heated via another type of heating element, such as e.g., radiant or induction heating elements. Paying constant attention to the location of the handle of a smart cookware during a cooking operation and monitoring its temperature can be an inconvenience to users. Further, in some instances, users can forget to monitor the temperature of the handle.

Accordingly, a smart appliance that addresses one or more of the challenges noted above would be useful. Further, methods for notifying a user of the handle temperature of a smart cookware and for preventing damage to the smart hardware components would also be beneficial.

BRIEF DESCRIPTION OF THE INVENTION

Aspects and advantages of the invention will be set forth in part in the following description, or may be apparent from the description, or may be learned through practice of the invention.

In one exemplary embodiment, a method is provided. The method includes receiving an input indicative of a temperature of a handle of a cookware placed on a heating element of a cooktop appliance. Further, the method includes determining whether the temperature of the handle exceeds a first temperature threshold based at least in part on the received input. Moreover, the method includes causing an alert to be presented indicating that the handle is located in a hot environment if the temperature exceeds the first temperature threshold.

In another exemplary embodiment, a cooking appliance is provided. The cooking appliance includes one or more heating elements for providing thermal energy to a cookware placed thereon, wherein a temperature sensing device and a communication interface positioned adjacent the temperature sensing device are embedded within or attached to a handle of the cookware. Further, the cooking appliance includes a user interface and a controller communicatively coupled with the one or more heating elements and the user interface. The controller is configured to: receive, from the temperature sensing device, an input indicative of the temperature of the handle of the cookware; determine whether the temperature exceeds a first temperature threshold based at least in part on the received input; and cause the user interface to present an alert if the temperature exceeds the first temperature threshold.

In yet another exemplary embodiment, a method is provided. The method includes receiving an input indicative of a temperature of a handle of a cookware placed on a heating element of one or more heating elements of a cooktop appliance. Further, the method includes determining whether the temperature of the handle exceeds a temperature threshold based at least in part on the received input. In addition, the method includes causing reduction in a power output of the one or more heating elements if the temperature of the handle exceeds the temperature threshold.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents. As used herein, terms of approximation, such as "approximately," "substantially," or "about," refer to being within a ten percent (10%) margin of error.

Figure 1:
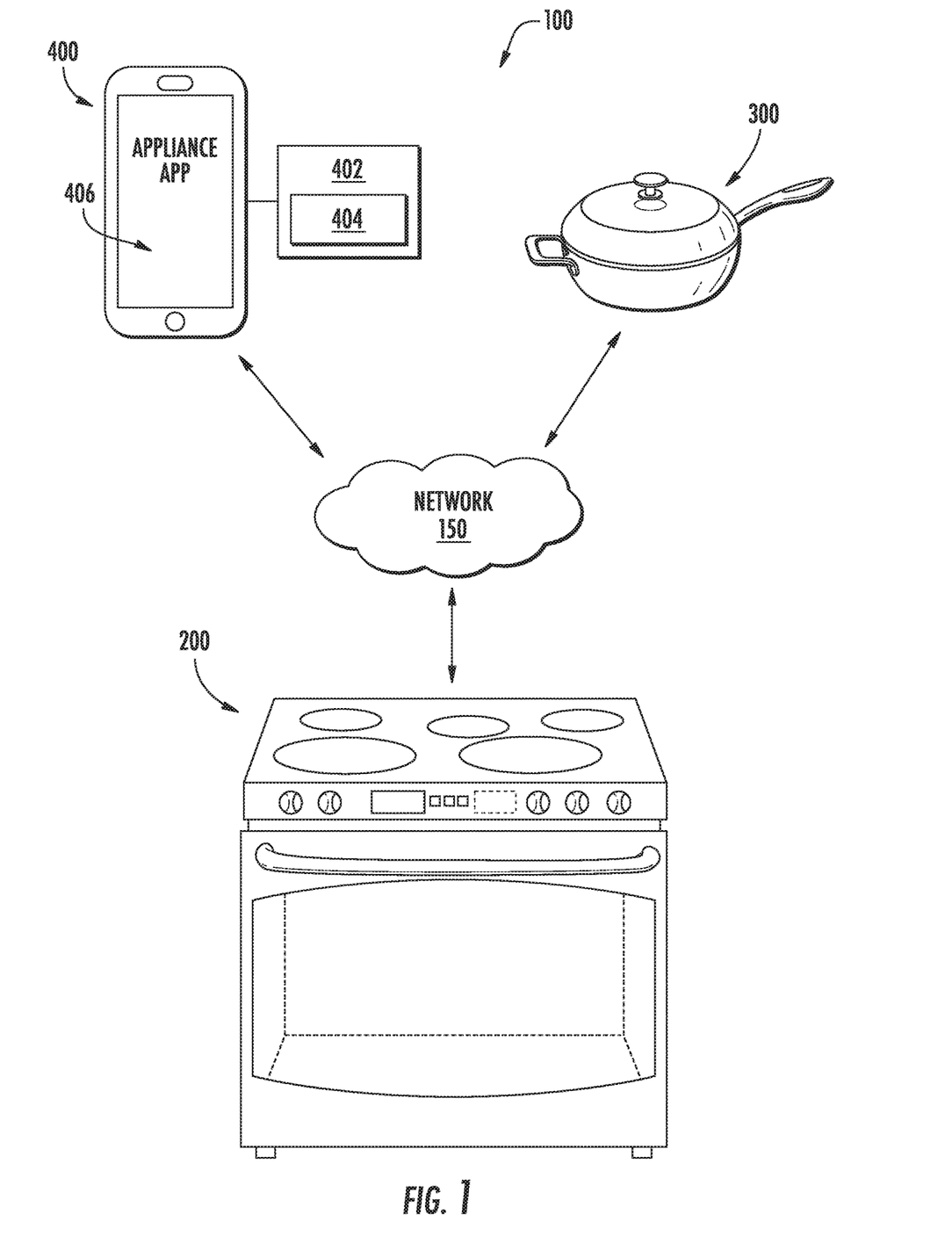
FIG. 1 provides a schematic view of a system according to example embodiments of the present subject matter.

FIG. 1 provides a schematic view of a system 100 according to example embodiments of the present subject matter. As depicted, system 100 includes a cooking appliance 200, one or more user devices 400, and a cookware 300, which is a smart cookware in this embodiment. In some embodiments, system 100 can include multiple or a plurality of cookware. As shown, cooking appliance 200, user device 400, and cookware 300 are communicatively coupled with one another via a network 150. Network 150 can be any suitable type of network, such as a local area network (e.g., intranet), wide area network (e.g., internet), low power wireless networks, e.g., Bluetooth Low Energy (BLE), or some combination thereof and can include any number of wired or wireless links. In general, communication over network 150 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

As will be detailed herein, based on one or more temperature readings sensed by a temperature sensing device embedded within or attached to cookware 300, cooking appliance 200 and/or user device 400 can present an alert indicating that the temperature at or within cookware 300 has exceeded a temperature threshold. For instance, the temperature sensing device can be embedded within a handle of cookware 300, and thus, the temperature reading can be indicative of the temperature of or at the handle of cookware 300. The temperature sensing device can be positioned adjacent one or more components of cookware 300 that provide cookware with "smart" functionality, such as e.g., a communication interface, circuitry, as well as other components. Such smart components can be limited by temperature. That is, such smart components can be damaged when subjected to temperatures above a threshold. Thus, when an alert is presented to a user, a user can take corrective action so that the smart components of the smart cookware 300 do not become damaged. For instance, the user can reduce the power output of the heating element upon which the smart cookware is placed, relocate the handle of the cookware to prevent overheating, among other possible corrective actions. In some embodiments, if the sense temperature reading exceeds a temperature threshold, which can be the same temperature threshold as noted above or a second temperature threshold, cooking appliance 200 can automatically reduce the power output of the heating element upon which smart cookware 300 is placed. For example, cooking appliance 200 can automatically turn off the heating element upon which smart cookware 300 is placed to prevent damage to the smart components of cookware 300.

Figure 2:
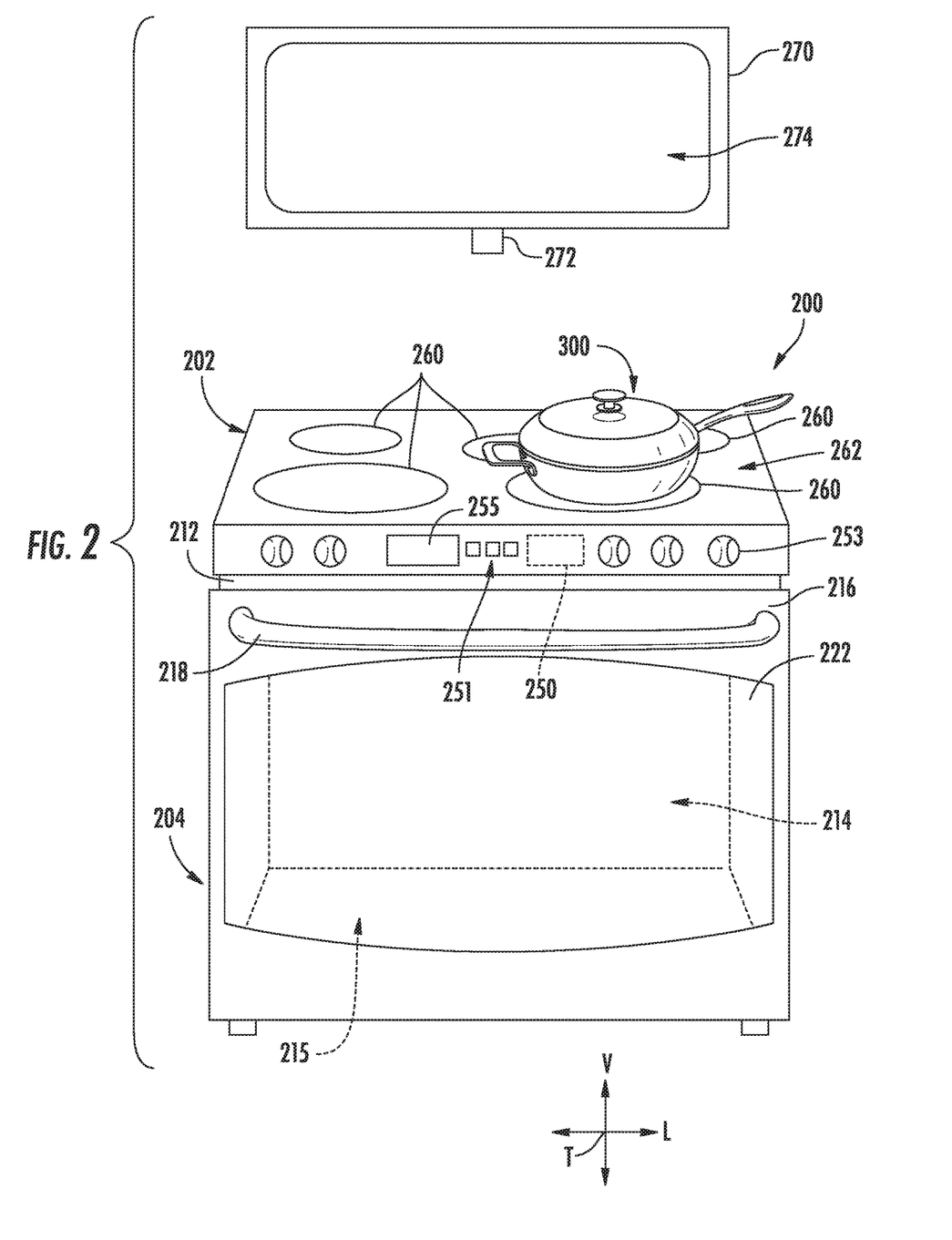
FIG. 2 provides a front view of a cooking appliance of the system of FIG. 1.

FIG. 2 provides a front view of cooking appliance 200 of system 100. For reference, cooking appliance 200 defines a vertical direction V, a lateral direction L, and a transverse direction T. The vertical direction V, lateral direction L, and transverse direction T are mutually perpendicular and form an orthogonal direction system. For the depicted embodiment of FIGS. 1 and 2, cooking appliance 200 includes a cooktop appliance 202 and an oven appliance 204. Thus, cooking appliance 200 may be referred to as an oven range appliance. However, the teachings and inventive aspects of the present disclosure may apply to any suitable cooking appliance having a cooktop. For instance, in some embodiments, cooking appliance 200 can be a standalone cooktop appliance. In addition, cooking appliance 200 is provided by way of example only. The example embodiments illustrated in the figures and described herein are not intended to limit the present subject matter to any particular cooking appliance configuration, except as otherwise indicated.

Cooking appliance 200 includes an insulated cabinet 212 that defines an oven cavity or cooking chamber 214 of oven appliance 204. More particularly, cooking chamber 214 is defined by various interior surfaces 215 of cabinet 212. Cooking chamber 214 is configured for receipt of one or more food items to be cooked. Cooking appliance 200 includes a door 216 rotatably mounted to cabinet 212, e.g., with a hinge (not shown). A handle 218 is mounted to door 216 and assists a user with opening and closing door 216 in order to access an opening to cooking chamber 214. For example, a user can pull on handle 218 to open or close door 216 and access cooking chamber 214 through the opening.

Cooking appliance 200 can include one or more seals (not shown) between door 216 and cabinet 212 that assist with maintaining heat and cooking fumes within cooking chamber 214 when door 216 is closed. One or more glass panes 22 provide for viewing the contents of cooking chamber 214 when door 216 is closed and assist with insulating cooking chamber 214.

Oven appliance 204 of cooking appliance 200 can include one or more heating elements. For instance, in some embodiments, oven appliance 204 can include a gas fueled or electric bottom heating element (e.g., a gas burner or an electric heating element), e.g., at a bottom portion of cabinet 212. Moreover, oven appliance 204 can include a top heating element positioned in cooking chamber 214 of cabinet 212, e.g., at a top portion of cabinet 212. The top heating element can be used to heat cooking chamber 214 for both cooking/broiling and cleaning of oven appliance 204. The top heating element can be an electric resistance heating element. However, in alternative embodiments, a gas, microwave, halogen, or any other suitable heating element may be used instead of electric resistance heating element.

Cooktop appliance 202 of cooking appliance 200 is positioned above oven appliance 204 along the vertical direction V. As shown in FIG. 2, cooktop appliance 202 includes a cooktop surface 262 having one or more heating elements 260 for use in, for example, heating or cooking operations. In some embodiments, cooktop surface 262 is constructed with ceramic glass. In other embodiments, however, cooktop surface 262 can be formed of another suitable material, such as a metallic material (e.g., steel) or another suitable non-metallic material. Heating elements 260 may be various sizes and can employ any suitable method for heating or cooking an object, such as cookware 300 and its contents. As shown in FIG. 2, cookware 300 is placed on one of heating elements 260. Heating element 260 can be any suitable type of heating element operable to provide thermal energy to a cookware placed thereon. In some embodiments, for example, heating element 260 uses a heat transfer method, such as e.g., electric resistance coils or gas burners, to cookware 300 placed thereon. In other embodiments, as another example, heating element 260 uses an induction heating method to heat the cooking utensil directly. Accordingly, heating elements 260 can include a gas burner element, resistive heat element, radiant heat element, induction element, or another suitable heating element. It will be appreciated that cooktop appliance 202 can have any suitable number of heating elements 260, the heating elements 260 can be arranged in any suitable configuration, and that the heating elements 260 can have any suitable size or shape.

As further shown in FIG. 2, cooking appliance 200 includes a controller 250, e.g., configured to control one or more operations of cooking appliance 200. For example, controller 250 may control at least one operation of cooking appliance 200 that includes one or more of heating elements 260. Controller 250 is communicatively coupled (via a suitable wired or wireless connection) with a number of components of cooking appliance 200, including one or more of the heating elements 260 of cooktop appliance 202, various components of a user interface 251, and other suitable components of cooking appliance 200. In some embodiments, controller 250 can be communicatively coupled with a temperature sensing device 312 embedded within cookware 300 placed on one of the heating elements 260 of cooktop appliance 202. In general, controller 250 is operable to configure cooking appliance 200 (and various components thereof) for cooking, and in some instances, during installation and calibration cycles. Such configuration can be based, for instance, on a plurality of selected operating cycles or modes, e.g., as selected at user interface 251.

By way of example, controller 250 can include one or more memory devices and one or more processing devices, such as general or special purpose microprocessors operable to execute programming instructions or micro-control code associated with an operating cycle. The memory device (i.e., memory) may represent random access memory such as DRAM, or read only memory such as ROM or FLASH. In some embodiments, the processor executes programming instructions stored in memory. The memory may be a separate component from the processor or may be included onboard within the processor. The memory can store information accessible to processing device, including instructions that can be executed by processing device. Optionally, the instructions can be software or any set of instructions that, when executed by the processing device, cause the processing device to perform operations. For certain embodiments, the instructions include a software package configured to operate cooking appliance 200 and interpret one or more electrical signals. For example, the instructions may include a software package configured to execute commands based on feedback from temperature sensing device 312 as described more fully below.

Controller 250 can be positioned in a variety of locations throughout cooking appliance 200. As illustrated in FIG. 2, controller 250 can be located at or behind a panel of user interface 251. In such embodiments, input/output ("I/O") signals may be routed between controller 250 and various operational components of cooking appliance 200, such as controls 253, a display component 255, heating elements 260 of cooktop appliance 202, alarms, alerts, and/or other components as may be provided.

In some embodiments, user interface 251 includes input components or controls 253, such as one or more of a variety of electrical, mechanical or electro-mechanical input devices. Controls 253 can include rotary dials, push buttons, and touch pads. Controller 250 is in communication with user interface 251 and controls 253 through which a user may select various operational features and modes and monitor progress of cooking appliance 200. In additional or alternative embodiments, user interface 251 includes display component 255, such as a digital or analog display in communication with controller 250 and configured to provide operational feedback to a user. In certain embodiments, user interface 251 represents a general purpose I/O ("GPIO") device or functional block. Display 255 can present various alerts and notifications as will be described further herein. Moreover, user interface 251 can include other means for presenting alerts, notifications, and communications to a user. For instance, user interface 251 can include a speaker operable to audibly present an alert to a user, a series of lights operable to flash in sequence based on the alert, haptic feedback, etc.

Figure 3:
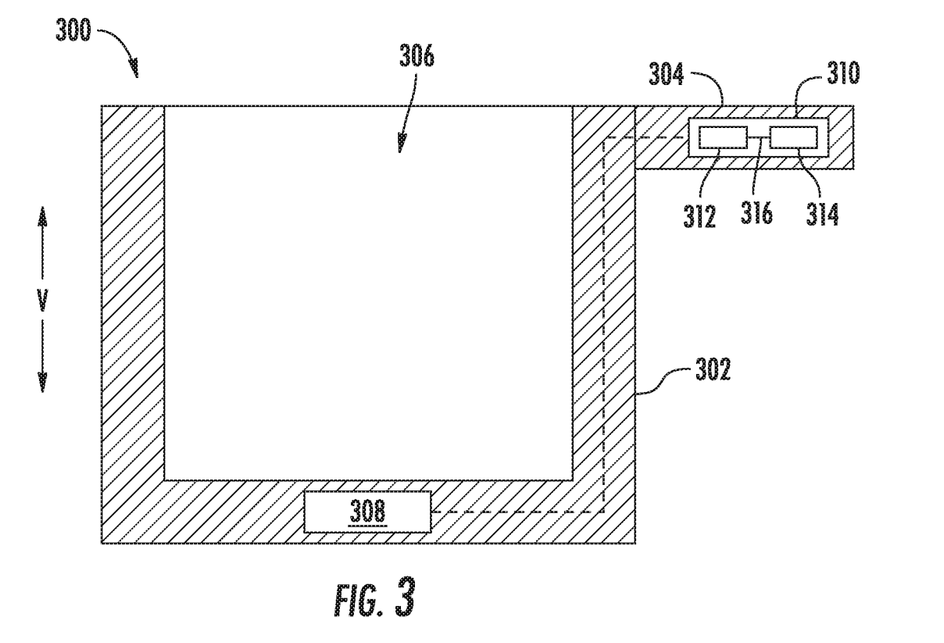
FIG. 3 provides a schematic view of an example smart cookware of the system of FIG. 1.

FIG. 3 provides a schematic view of an example smart cookware 300 of system 100. As shown, cookware 300 has a body 302 and a handle 304 extending from body 302. A user can grasp handle 304 to move cookware 300 in the desired position, such as e.g., onto a heating element of a cooktop appliance as shown in FIG. 2. Body 302 defines a cooking cavity 306 configured for receipt of one or more food items. A thermocouple 308 is disposed within a bottom wall of body 302. Thermocouple 308 is operable to sense the temperature proximate the bottom wall of cookware 300.

Notably, for this embodiment, a smart module 310 is embedded within handle 304. Smart module 310 includes a temperature sensing device 312 and a communication interface 314 communicatively coupled with temperature sensing device 312, e.g., via circuitry 316. Thus, temperature sensing device 312 and the communication interface 314 are embedded within handle 304 of cookware 300 in this embodiment. Temperature sensing device 312 is positioned adjacent communication interface 314 as shown in FIG. 3. In some embodiments, communication interface 314 and/or circuitry 316 can be enclosed within a protective housing or sheath, e.g., to protect them from high temperatures. Temperature sensing device 312 can be any suitable device operable to sense the temperature of or at handle 304. For instance, for this embodiment, temperature sensing device 312 is a thermistor. Communication interface 314 is operable to communicatively couple or connect cookware 300 with various networks, such as e.g., network 150. Communication interface 314 can include any suitable components for interfacing with one more networks. For example, communication interface 314 can include one or more transmitters, receivers, ports, controllers, antennas, or other suitable components for interfacing with network 150 and/or other networks. Communication interface 314 can establish communication with a network in any suitable manner, e.g., via a wired or wireless communication link, and with any suitable protocol.

In some embodiments, temperature sensing device 312 can sense the temperature of or at handle 304 and one or more signals indicative of the temperature can be routed to communication interface 314. Communication interface 314 can then send or otherwise communicate the temperature reading to controller 250 of cooking appliance 200 (FIG. 2) and/or to user device 400 (FIG. 1), for example. In this way, as will be explained in detail herein, an alert can be presented to a user indicating that the temperature of handle 304 is located in a hot environment as the temperature has reached a temperature threshold, and accordingly, a user can take corrective action. Moreover, as shown in FIG. 3, thermocouple 308 is communicatively coupled with smart module 310. Particularly, thermocouple 308 is communicatively coupled with communication interface 314 such that temperature readings indicative of the bottom of cookware 300 can be communicated to controller 250 of cooking appliance 200 (FIG. 2) and/or to user device 400 (FIG. 1).

Figure 4:
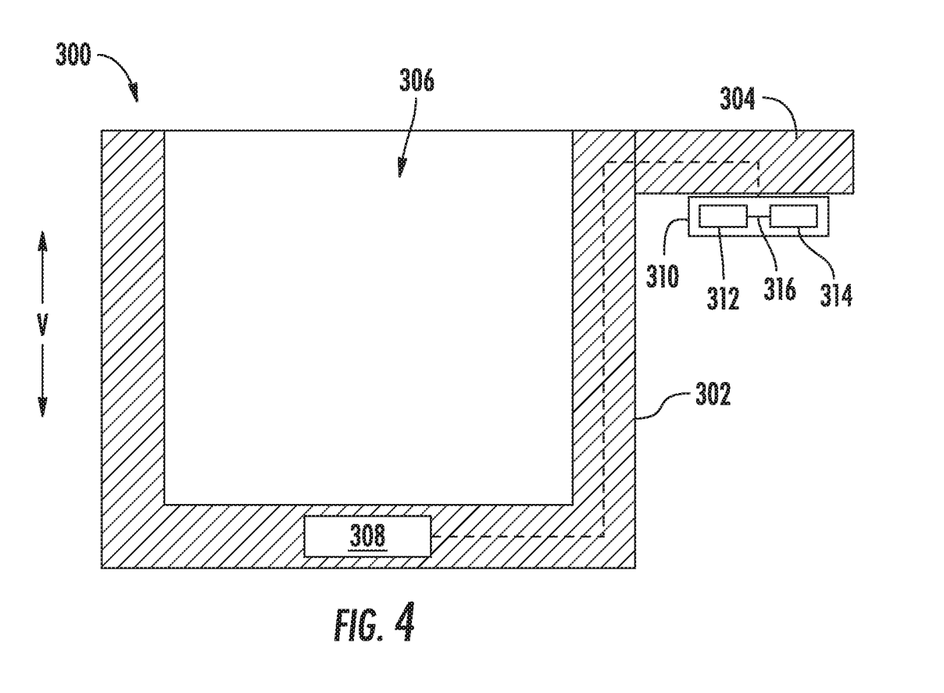
FIG. 4 provides a schematic view of an example cookware that can be employed with the system of FIG. 1.

FIG. 4 provides a schematic view of another example cookware 300 that can be employed with the system 100 of FIG. 1. As depicted, for cookware 300 of FIG. 4, temperature sensing device 312 and communication interface 314 are attached to cookware 300. Specifically, for this embodiment, smart module 310 is attached to handle 304 as shown. Temperature sensing device 312, communication interface 314, and circuitry 316 are all enclosed within smart module 310 and function as described above.

Returning to FIG. 1, system 100 includes user device 400. User device 400 can be communicatively coupled with or connected to the network 150. For instance, in some embodiments, user device 400 can connect to network 150 wirelessly or via a wired connection. User device 400 includes a processing device and/or controller 402, a communication interface 404, and a user interface 406. User device 400 can be any suitable type of electronic device connectable with network 150 and capable of presenting one or more alerts, notifications, communications, etc. For example, user device 400 can be a personal computing device (e.g., laptop or desktop), a mobile computing device (e.g., smartphone, tablet, smartwatch), a gaming console or controller, a wearable computing device, an embedded computing device, a remote, or any other suitable type of user device. For this embodiment, user device 400 is a smartphone. Although only one (1) user device is shown in FIG. 1, system 100 can include multiple or a plurality of user devices.

Controller 402 of user device 400 can include one or more processors and one or more memory devices, and can provide user device 400 functionality. The processor(s) of controller 402 can be any suitable processing device, such as a microprocessor, microcontroller, integrated circuit, or other suitable processing device. The memory device(s) of controller 402 can include any suitable computing system or media, including, but not limited to, non-transitory computer-readable media, RAM, ROM, hard drives, flash drives, or other memory devices. The memory of controller 402 can store information accessible by processor(s) of controller 402, including instructions that can be executed by processor(s) of controller 402 in order to operate various components of user device 400 to provide user device 400 functionality. Controller 402 is communicatively coupled with various operational components of user device 400, such as e.g., user interface 406 and communication interface 404. User interface 406 of user device 400 can include a touch screen and/or one or more buttons. Input/output ("I/O") signals may be routed between controller 402, user interface 406, and communication interface 404 (as well as other operational components of user device 400), e.g., via an integrated control board of user device 400. Controller 402 can execute various applications, such as e.g., an "Appliance App", as shown in FIG. 1. The Appliance App can be specifically designed to control appliance 110 remotely, e.g., via network 150, and for presenting information relating to cooking appliance 200 and/or cookware 300, such as, e.g., alerts indicating that handle 304 of cookware 300 is located in a hot environment. The Appliance App can be managed by a manufacturer of the appliance, for example.

Communication interface 404 of user device 400 is operable to communicatively couple or connect user device 400 with various networks, such as e.g., network 150. Communication interface 404 can include any suitable components for interfacing with one more networks. For example, communication interface 404 can include transmitters, receivers, ports, controllers, antennas, or other suitable components for interfacing with network 150 and/or other networks. Communication interface 404 can establish communication with a network in any suitable manner, e.g., via a wired or wireless communication link, and with any suitable protocol. Controller 402 can provide control functionality for communication interface 404.

Further, in some embodiments, as shown in FIG. 2, user device 400 can be a smart hub 270. Smart hub 270 can be located above cooking appliance 200 along the vertical direction V, e.g., directly above, or in some other suitable location. Smart hub 270 can have a display 274, such as a touchscreen, operable to present certain information to a user, such as e.g., one or more recipes, instructional videos, alerts, notifications, other communications, etc. Thus, display 274 can be the user interface of smart hub 270. Moreover, smart hub 270 can include a camera 272 operable to collect one or more images, e.g., of food items, cookware 300 placed on cooktop appliance 202, as well as other items/objects. Smart hub 270, including camera 272, can be communicatively coupled with controller 250 of cooking appliance 200. Smart hub 270 and cooking appliance 200 can each send and receive communications from one another.

Figure 5:
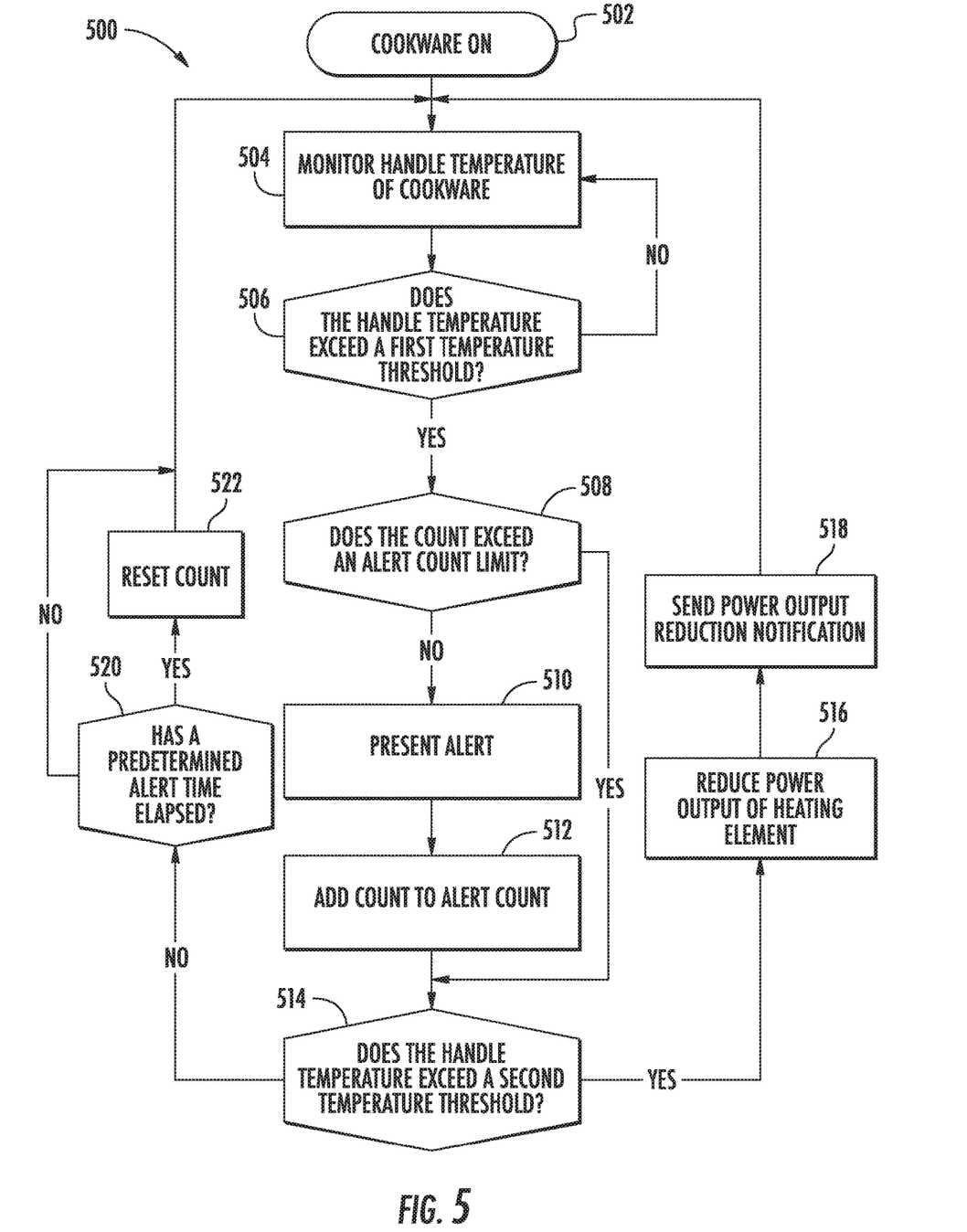
FIG. 5 provides a flow diagram of a method for presenting an alert indicative of a temperature of a handle of a smart cookware according to example embodiments of the present subject matter.

An example manner in which temperature readings collected by temperature sensing device 312 in handle 304 of cookware 300 can be used to reduce the power output of one or more heating elements 260 and/or to notify a user via cooking appliance 200 and/or user device 400 that handle 304 of cookware 300 requires relocating to prevent overheating of the smart components of cookware 300 will now be described below as set forth in method (500).

FIG. 5 provides a flow diagram of a method (500) for presenting an alert indicating that a handle of a smart cookware placed on a heating element of a cooktop appliance is located in a hot environment and/or reducing a power output of a heating element upon which the cookware is placed based at least in part on one or more temperature readings according to example embodiments of the present subject matter. For instance, the cooktop appliance can be cooktop appliance 202 of cooking appliance 200. The cookware can be smart cookware 300 of FIG. 3 or cookware 300 of FIG. 4. The alert can be presented by cooking appliance 200 and/or user device 400. Accordingly, reference numerals used to denote certain features of system 100 of FIG. 1 and described in the accompanying text will be utilized below. However, as will be appreciated, method (500) is applicable to other suitable cooktop appliances, cookware, and user devices. In addition, it will be appreciated that method (500) can be modified, adapted, expanded, rearranged and/or omitted in various ways without deviating from the scope of the present subject matter.

At (502), the method (500) includes turning on the smart features of the cookware. For instance, when cookware 300 is placed on heating element 260 as shown in FIG. 2 and heating element is turned to an on position such that heating element provides thermal energy to cookware 300, the smart features of cookware 300 can automatically turn on. That is, temperature sensing device 312 and communication interface 314 can be turned to the on position, e.g., so that one or more temperature readings can be taken or otherwise collected and routed to communication interface 314 such that communication interface 314 can send or otherwise communicate the temperature readings to cooking appliance 200 and/or user device 400. In yet other implementations, cookware 300 can include a power or on button that a user may manipulate to turn on the smart features of cookware 300. The smart features of cookware 300 can be turned to the on position in any suitable manner.

At (504), the method (500) includes monitoring a temperature of a handle of the cookware, e.g., during a cooking operation. For instance, when cookware 300 is placed on heating element 260 and thermal energy is applied to cookware 300, temperature sensing device 312 embedded within handle 304 of cookware 300 can sense the temperature of handle 304. As temperature sensing device 312, communication interface 314, and the smart sensing circuitry 316 are embedded within handle 304 (e.g., as shown in FIG. 3) or attached to handle 304 (e.g., as shown in FIG. 4), the temperature of handle 304 is in turn indicative of the temperature of these smart components. Temperature sensing device 312 can constantly monitor the temperature of handle 304 during a cooking operation or can measure the temperature of handle 304 at predetermined time intervals, such as e.g., every five (5) seconds, every ten (10) seconds, every fifteen (15) seconds, etc.

Upon sensing the temperature of handle 304, the sense data/signals indicative of the temperature of handle 304 can be sent or otherwise communicated to a controller and/or processing device of one or more of cooking appliance 200, cookware 300, and user device 400. For instance, controller 250 of cooking appliance 200 can receive an input indicative of a temperature of handle 304 of cookware 300 placed on heating element 260 of cooktop appliance 202. By way of example, communication interface 314 can receive one or more signals from temperature sensing device 312 indicative of the temperature of handle 304 and can route such signals to controller 250 of cooking appliance 200. Additionally or alternatively, controller 402 of user device 400 can receive an input indicative of the temperature of handle 304 of cookware 300 placed on heating element 260 of cooktop appliance 202. By way of example, communication interface 314 can receive one or more signals from temperature sensing device 312 indicative of the temperature of handle 304 and can route such signals to communication interface 404 of user device 400. The signals can then be routed from communication interface 404 to a processing device of controller 402. Further, additionally or alternatively, a controller or processing device located within smart module 310 can receive an input indicative of the temperature of handle 304 of cookware 300 placed on heating element 260 cooktop appliance 202. By way of example, the controller or processing device embedded within smart module 310 can receive one or more signals from temperature sensing device 312 indicative of the temperature of handle 304. Accordingly, a controller or processing device of one or more of cooking appliance 200, cookware 300, and user device 400 can receive an input indicative of the temperature of handle 304 of cookware 300 placed on heating element 260 of cooktop appliance 202.

At (506), the method (500) includes determining whether the temperature of the handle exceeds a first temperature threshold based at least in part on the received input. For instance, after controller 250 of cooking appliance 200 receives the input indicative of the temperature of handle 304 of cookware 300, a processing device of controller 250 can determine whether the temperature of the handle exceeds the first temperature threshold. In some implementations, the first temperature threshold is a value between 150° C. and 175° C. For instance, the first temperature threshold can be set at 150° C. In some implementations, the first temperature threshold is set at a value that corresponds with a limiting temperature of one or more of the components of smart module 310. In yet other implementations, the first temperature threshold is set at a value having a margin from the limiting temperature of one or more of the components of smart module 310. For example, if the limiting temperature of communication interface 314 is 150° C., the first temperature threshold can be set at 140° C. to provide a degree of margin. In other implementations, controller 402 of user device 400 can determine whether the temperature of handle 304 exceeds the first temperature threshold. Moreover, in some implementations, the controller or processing device located within smart module 310 embedded or attached to handle 304 can determine whether the temperature of handle 304 exceeds the first temperature threshold.

As depicted in FIG. 5, if the sensed temperature of handle 304 does not exceed the first temperature threshold as determined at (506), then the method (500) returns to (504) and temperature sensing device 312 continues to monitor the temperature of handle 304. However, if the sensed temperature of handle 304 exceeds the first temperature threshold as determined at (506), the method (500) proceeds to (508).

At (508), the method (500) includes determining whether a count of an alert count exceeds an alert count limit. The alert count limit can be set at any suitable value. For instance, the predetermined count limit can be set at a value of one (1). The count of the alert count can correspond with the number of times that an alert is presented to a user at (510), e.g., via user interface 251 of cooking appliance 200 and/or user interface 406 of user device 400. By implementing a count, or an alert count in this instance, an alert need not be sent to a user each time the temperature of handle 304 exceeds the first temperature threshold as determined at (506). As shown in FIG. 5, if the count exceeds the predetermined count limit, the method (500) bypasses (510) and (512) and proceeds to (514). If the count does not exceed the predetermined count limit, the method (500) proceeds to (510).

At (510), if the sensed temperature exceeds the first temperature threshold as determined at (506) and if the count of the alert count does not exceed the alert count limit as determined at (508), the method (500) includes causing an alert to be presented indicating that the handle is located in a hot environment. For instance, controller 250 of cooking appliance 200 can cause one or more components of user interface 251 to present the alert. As one example, controller 250 can cause display 255 of user interface 251 to visually present the alert to the user. As another example, controller 250 can cause a speaker of user interface 251 to audibly present the alert to the user. In some implementations, controller 250 can cause display 255 to visually present the alert to the user and the speaker to audibly present the alert to the user. For instance, display 255 can present the alert "WARNING—Adjust Cookware Handle from Hot Environment" or the like and the speaker can generate a chime or some other suitable noise recognizable to a user as an alert. It will be appreciated that user interface 251 of cooking appliance 200 can present the alert to a user and other suitable ways as well.

In some implementations, additionally or alternatively to cooking appliance 200 presenting the alert, controller 402 of user device 400 can cause user interface 406 to present the alert to the user. The alert can be presented by user device 400 to the user in any suitable manner, e.g., visually, audibly, via haptic feedback, etc., or a combination thereof. For example, the Appliance App running on a smartphone can present the alert notifying the user to move or relocate handle 304 and can present other information, such as e.g., the temperature of handle 304, the temperature of the bottom of cookware 300, etc. As another example, an application running on smart hub 270 (a user device) can present the alert via display 274.

At (512), after causing the alert to be presented indicating that the handle is located in a hot environment at (510), the method (500) includes adding a count to the alert count. For instance, if the current count is zero (0) and an alert is presented at (510), one (1) count can be added to the alert count such that the alert count totals one (1) count. Controller 250 of cooking appliance 200 can add a count to the alert count. Additionally or alternatively, controller 402 of user device 400 can add a count to the alert count. One or both of the controllers 250, 402 can track the alert count. The alert count can be reset, e.g., if the smart features of cookware 300 are turned off. After a count is added to the alert count, the method (500) proceeds to (514).

At (514), the method (500) includes determining whether the temperature of the handle exceeds a second temperature threshold based at least in part on the received input. For instance, a processing device of controller 250 can determine whether the temperature of the handle exceeds the second temperature threshold. In some implementations, the second temperature threshold is a value between 190° C. and 210° C. For instance, the second temperature threshold can be set at 200° C. In some implementations, the second temperature threshold is set at a value that corresponds with a failure temperature of one or more of the components of smart module 310. In yet other implementations, the second temperature threshold is set at a value having a margin from the failure temperature of one or more of the components of smart module 310. For example, if the failure temperature of communication interface 314 is 200° C., the second temperature threshold can be set at 190° C. to provide a degree of margin relative to the failure temperature. In other implementations, controller 402 of user device 400 can determine whether the temperature of handle 304 exceeds the second temperature threshold. Moreover, in some implementations, the controller or processing device located within smart module 310 embedded or attached to handle 304 can determine whether the temperature of handle 304 exceeds the second temperature threshold.

As illustrated in FIG. 5, if the sensed temperature of handle 304 does not exceed the second temperature threshold as determined at (514), then the method (500) proceeds to (520). However, if the sensed temperature of handle 304 exceeds the second temperature threshold as determined at (514), the method (500) proceeds to (516).

At (516), if the temperature of the handle exceeds the second temperature threshold as determined at (514), the method (500) includes causing a reduction in a power output of one or more heating elements, including for example, the heating element upon which cookware is placed. For instance, controller 250 can be communicatively coupled with heating element 260, and if the temperature of handle 304 exceeds the second temperature threshold, controller 250 can send or otherwise communicate, and heating element 260 can receive, one or more control signals representative of instructions for reducing the power output of heating element 260. In some implementations, controller 250 can cause the power output of heating element 260 to reduce in power output automatically upon determining that the temperature of handle 304 exceeds the second temperature threshold. In yet other implementations, a confirmation notification can be sent to a user requesting that the user confirm or acknowledge that heating element 260 requires a reduction in power output. Then, upon confirmation from the user, controller 250 can cause the power output of heating element 260 to reduce.

In some implementations, causing the reduction in the power output of the heating element 260 includes turning off heating element 260. Stated differently, causing the reduction in power output of heating element 260 can include reducing the power output of heating element 260 to zero (0) such that heating element 260 no longer provides thermal energy to cookware 300. In yet other implementations, causing the reduction in power output of heating on the 260 can include reducing the power output of heating element 260 by a percentage, e.g., by 25%. In this way, the cooking operation can continue whilst preventing damage to the smart components of cookware 300, e.g., by removing them from the hot environment in which the temperature exceeds the second temperature threshold.

Further, in some implementations, cooktop appliance 202 of cooking appliance 200 can include multiple heating elements 260, e.g., as shown in FIG. 2. In some instances, adjacent heating elements 260 can provide thermal energy simultaneously. In some instances, it is possible that handle 304 of cookware 300 is hovering over an adjacent heating element 260 providing thermal energy that is different from the heating element 260 upon which body 302 of cookware 300 is placed. In such implementations, the method (500) can include identifying the heating element over which the handle of cookware is positioned (e.g., along the vertical direction V), and causing a reduction in power output of the identified heating element. For instance, a camera 272 (e.g., of a smart hub 270 positioned above cooking appliance 200 along the vertical direction V) can capture one or more images of cookware 300 and heating elements 260 cooktop appliance 202. The images can be routed to controller 250. Based on the one or more images, controller 250 can determine the position or location of handle 304 of cookware 300. And, if handle 304 is positioned over a heating element positioned adjacent the heating element 260 upon which cookware 300 is placed, controller 250 can cause a reduction in power output of one or both of the heating elements 260, i.e., the heating element upon which cookware 300 is placed and the adjacent heating element 260 over which handle 304 is positioned.

In yet other implementations, if controller 402 of user device 400 determines that the temperature of handle 304 exceeds the second temperature threshold, then user device 400 can send or otherwise communicate one or more signals to controller 250 of cooking appliance 200 representative of instructions for reducing the power output of heating element 260.

At (518), after reducing the power output of one or more heating elements of cooktop appliance, the method (500) includes causing a notification to be presented indicating that the power output of the heating element has been reduced. For instance, the notification can provide the user with information relating to why the cooking operation was interrupted and what future actions can be taken to prevent such interruptions. In some implementations, controller 250 of cooking appliance 200 can cause one or more components of user interface 251 to present the notification. As one example, controller 250 can cause display 255 of user interface 251 to visually present the notification to the user. As another example, controller 250 can cause a speaker of user interface 251 to audibly present the notification to the user. In some implementations, controller 250 can cause both display 255 and the speaker to present the notification. Further, in some implementations, additionally or alternatively to cooking appliance 200 presenting the notification, controller 402 of user device 400 can cause user interface 406 to present the alert to the user. The alert can be presented by user device 400 to the user in any suitable manner, e.g., visually, audibly, via haptic feedback, etc., or a combination thereof. After reducing the power output of one or more of the heating elements at (514) and presenting the notification at (516), the method (500) can revert to monitoring the temperature of handle 304 at (504) as shown in FIG. 5.

At (520) and (522), the method (500) includes determining whether a predetermined alert time has elapsed, and if so, the method (500) includes resetting the alert count, e.g., to zero (0). For instance, the predetermined alert time can be thirty (30) seconds, two (2) minutes, or some other suitable value. As shown in FIG. 5, if the predetermined alert time has elapsed as determined at (520), then the alert count is reset at (522). If, on the other hand, the predetermined alert time has not elapsed as determined at (520), then (522) is bypassed and consequently the alert count is not reset. Accordingly, if the alert count reaches an alert count limit, no further alerts are presented until the predetermined alert time has elapsed. Each time the predetermined alert time elapses, the predetermined alert time can reset at its set point value, e.g., thirty (30) seconds. The timer for the predetermined alert time can commence when it is determined that the temperature of handle 304 has exceeded the first temperature threshold at (506), for example. The predetermined alert time can be variable or fixed. Although shown subsequent to (514), it will be appreciated that (520) and (522) can additionally be positioned between (518) and (504) along the flow chart of FIG. 5 or some other suitable location. Thus, (520) and (522) can be positioned as shown between (514) and (504) and between (518) and (504) such that no matter the outcome of (514), the alert count is reset if the predetermined alert time has elapsed.

The system 100 and method (500) described herein provide a number of advantages and benefits. For instance, the system 100 and method (500) provided herein prevent consumers from damaging smart components as well as other temperature sensitive components within handle 304 of cookware 300. For instance, the system 100 can alert a user that the handle of the cookware is located in a hot environment and that the handle should be relocated or moved. Further, if the alerts go unaddressed, the cooktop appliance can reduce the power output of one or more heating elements to reduce or eliminate the hot environment in which the handle is located. Further, many smart cookware include temperature sensing devices already present in the handle; thus, few if any additional parts are required for implementing method (500). The system 100 and method (500) described herein can include other advantages and benefits not explicitly listed herein as will be appreciated by those of skill in the art.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A method, comprising:
   receiving an input indicative of a temperature of a handle of a cookware placed on a heating element of a cooktop appliance;
   determining whether the temperature of the handle exceeds a first temperature threshold based at least in part on the received input;
   causing an alert to be presented indicating that the handle is located in a hot environment if the temperature exceeds the first temperature threshold; and
   determining whether the temperature of the handle exceeds a second temperature threshold based at least in part on the received input.

2. The method of claim 1, further comprising:
   causing reduction in a power output of the heating element if the temperature of the handle exceeds the second temperature threshold.

3. The method of claim 2, wherein causing reduction in the power output of the heating element comprises turning off the heating element.

4. The method of claim 2, wherein, if the power output of the heating element is reduced, the method further comprises:
   causing a notification to be presented indicating that the power output of the heating element has been reduced.

5. The method of claim 1, wherein after causing the alert to be presented indicating that the handle is located in the hot environment if the temperature exceeds the first temperature threshold, the method further comprises:
   adding a count to an alert count.

6. The method of claim 5, wherein if the alert count reaches an alert count limit, no further alerts are presented until a predetermined alert time has elapsed.

7. The method of claim 1, wherein the alert indicating that the handle is located in the hot environment is presented on a user device communicatively coupled with the smart cookware.

8. The method of claim 1, wherein the alert indicating that the handle is located in the hot environment is presented on a user interface of the cooktop appliance.

9. The method of claim 1, wherein the heating element is one of a plurality of heating elements of cooktop appliance, and wherein the method further comprises:
   determining whether the temperature of the handle exceeds a second temperature threshold based at least in part on the received input; and
   identifying one or more heating elements of the plurality of heating elements over which the handle of the cookware is positioned; and
   causing reduction in a power output of the one or more identified heating elements if the temperature of the handle exceeds the second temperature threshold.

10. A cooking appliance, comprising:
    one or more heating elements for providing thermal energy to a cookware placed thereon, wherein a temperature sensing device and a communication interface positioned adjacent the temperature sensing device are embedded within or attached to a handle of the cookware;
    a user interface; and
    a controller communicatively coupled with the one or more heating elements and the user interface, the controller configured to:
    receive, from the temperature sensing device, an input indicative of the temperature of the handle of the cookware;
    determine whether the temperature exceeds a first temperature threshold based at least in part on the received input;
    cause the user interface to present an alert if the temperature exceeds the first temperature threshold;
    determine whether the temperature exceeds a second temperature threshold based at least in part on the received input; and
    cause reduction in a power output of one or more of the one or more heating elements if the temperature exceeds the second temperature threshold.

11. The cooking appliance of claim 10, wherein the controller is further communicatively coupled with a user device, and wherein if the temperature exceeds the first temperature threshold, the controller is further configured to:
    send a communication to the user device such that the alert can be presented via the user device.

12. The cooking appliance of claim 10, wherein the temperature sensing device and the communication interface are embedded within the handle of the cookware.

13. The cooking appliance of claim 10, wherein the temperature sensing device and the communication interface are embedded within a smart module attached to the handle of the cookware.

14. A method of cookware operation, comprising:
- receiving an input indicative of a temperature of a handle of a cookware placed on a heating element of one or more heating elements of a cooktop appliance;
- determining whether the temperature of the handle exceeds a first temperature threshold based at least in part on the received input;
- causing reduction in a power output of the one or more heating elements if the temperature of the handle exceeds the first temperature threshold;
- determining whether the temperature of the handle exceeds a second temperature threshold based at least in part on the received input, wherein the first temperature threshold is set at a lower temperature than the second temperature threshold; and
- causing an alert to be presented indicating that the handle is located in a hot environment if the temperature exceeds the first temperature threshold.

15. The method of claim 14, wherein the alert is presented on a user device, wherein the user device is a smart hub positioned above the cooktop appliance.

16. The method of claim 14, wherein the input indicative of the temperature of the handle of the cookware is a thermistor.

17. The system of claim 14, wherein the one or more heating elements are gas burner heating elements.

* * * * *